United States Patent

Morlec et al.

[11] Patent Number: 5,853,687
[45] Date of Patent: Dec. 29, 1998

[54] METHOD OF MANUFACTURE OF CARBON BLACK BY PYROLYSIS OF RUBBER WASTE PREVIOUSLY GROUND AND FROM WHICH THE SCRAP HAS BEEN REMOVED

[75] Inventors: Jean Morlec; Christian Hamon, both of Saint Nazaire, France

[73] Assignee: Institut Francais du Petrole, France

[21] Appl. No.: 837,425

[22] Filed: Apr. 17, 1997

Related U.S. Application Data

[63] Continuation of Ser. No. 517,959, Aug. 22, 1995, abandoned.

[30] Foreign Application Priority Data

Aug. 22, 1994 [FR] France .................................. 94/10.236

[51] Int. Cl.⁶ ...................................................... C09C 1/48
[52] U.S. Cl. ........................................ 423/449.7; 588/213
[58] Field of Search .............................. 423/449.7, 449.6; 502/416; 110/346; 588/213, 226

[56] References Cited

U.S. PATENT DOCUMENTS

| | | | |
|---|---|---|---|
| 3,823,224 | 7/1974 | Laman et al. | 423/449.7 |
| 3,966,487 | 6/1976 | Crane et al. | 106/307 |
| 4,203,804 | 5/1980 | Jaming et al. | 201/2.5 |
| 4,284,616 | 8/1981 | Solbakken et al. | 423/449.7 |
| 5,084,141 | 1/1992 | Holland | 423/449.1 |
| 5,506,274 | 4/1996 | Brown | 423/449.7 |

FOREIGN PATENT DOCUMENTS

| | | |
|---|---|---|
| 0 070 040 | 1/1983 | European Pat. Off. . |
| 2 392 803 | 12/1978 | France . |
| 1 939 715 | 2/1971 | Germany . |

OTHER PUBLICATIONS

Webster's 7th New Collegiate Dictionary, G. & C. Merriam Co. 1965 p.339.

Ogasawara et al., *Preparation of Activated Carbon by Thermal Decomposition of Used Automotive Tires,* Ind. Eng. Chem. Res. 1987, (26) 2552–2556.

*Primary Examiner*—Gary P. Straub
*Assistant Examiner*—Stuart L. Hendrickson
*Attorney, Agent, or Firm*—Millen, White, Zelano, & Branigan, P.C.

[57] ABSTRACT

The invention relates to a method of manufacture of carbon black by pyrolysis of rubber waste previously ground and from which the scrap has been removed. With this method, pyrolysis is carried out in the presence of at least one gas selected from water vapour, carbon dioxide, a combustion gas or a mixture of water vapour and at least one inert gas.

4 Claims, No Drawings

METHOD OF MANUFACTURE OF CARBON BLACK BY PYROLYSIS OF RUBBER WASTE PREVIOUSLY GROUND AND FROM WHICH THE SCRAP HAS BEEN REMOVED

This application is a continuation, of abandoned application Ser. No. 08/517,959, filed Aug. 22, 1995.

BACKGROUND OF THE INVENTION

The processing or upgrading of rubber waste, for example of worn tires containing or not containing metals, possibly metallised, and for example containing copper, is one of the main concerns with regard to the environment. The inevitable costs of dumping will become prohibitive in years to come. Moreover, the space available will continue to decrease and will be reserved for what is currently known as ultimate wastes. One must also emphasise the danger posed by storage of such waste (for example, tires), being a combustible material, and the need to eliminate the fly-tipping of tires which often occurs in the countryside.

It is therefore imperative that solutions be found for converting this used rubber. They must allow elimination of these dangerous and bulky materials under acceptable economic conditions. If metals are present it is desirable, if possible, to remove the metals, for example copper, from such waste.

SUMMARY OF THE INVENTION

This object has already been the subject matter of various approaches, certain of which are currently used at industrial level.

Tires, for example, have a high calorific value (8,000 Kcal/kg, that is to say 33,472 KJ/kg) which is close to that of crude oil, and upgrading for calorie production is one of the processes which has been used. In certain countries this can be translated into electrical energy production.

This process does not, however, appear to be a solution for the future, as the use of tires as an energy source involves substantial investments and more complex expertise, and not such efficient temperature regulation with respect to the methods used as they require increasingly precise control.

The other process of upgrading of tires or rubber can be limited to grinding to produce granules (mechanical grinding) or fine powder (freeze grinding).

The methods also comprise a scrap removal stage to separate the metals contained. The applications for these products are varied; in all cases they are used in production of materials, and more particularly paving slabs or tar for road surfaces or sports grounds.

However, this process can only be developed in a limited manner and the potential market can only absorb a small amount of the stock to be upgraded.

Other upgrading processes to provide credible answers to this used tire problem must be found.

This is the subject-matter of the invention described hereinafter.

The invention relates to a method of manufacture of carbon black by pyrolysis of rubber waste previously ground and from which the scrap has been removed.

Pyrolysis is generally carried out in the presence of at least one gas selected from water vapour, carbon dioxide, a combustion gas, or a mixture of water vapour and at least one inert gas.

Preferably, rubber waste previously ground and with the scrap is removed from it is presented as granules, the granular dimension of which is between 2 and 5 mm.

The invention relates to the production of carbon black by pyrolysis of rubber waste (tires or various types of rubber).

Pyrolysis is understood to be thermal processing in a controlled atmosphere, composed of a mixture of at least one inert gas (such as $N^2$) and water vapour. As will be described later, in certain cases it can be limited to the injection of water vapour or carbon dioxide, or of a combustion gas (burner exhaust vapours).

Within the framework of the present invention, the pyrolysis process is preferably carried out continuously or in batches in an indirectly heated rotating furnace and at atmospheric pressure, for example a furnace such as described in EP-A-571251.

At an industrial level, the furnace will be entirely, or at least mainly, heated by combustion of gases produced during pyrolysis of rubber waste.

Waste→carbon black+gas

The gas contains in particular hydrogen and various hydrocarbons.

The furnace, or pyrolysis area is continuously supplied with rubber waste previously ground and from which the scrap has been removed according to techniques known to the man skilled in the art. These are normally known as granules. The granular dimensions are preferably between approximately 2mm and 5mm.

The furnace which can be used in the present invention is equipped with various devices; in particular the furnace inlet/outlet gaskets are sealed in order to avoid any air entering the furnace (gas-tight furnace).

The furnace is swept in the direction of or counter to the direction of the rubber granules by at least one inert gas, for example a mixture of an inert gas, preferably $N_2$ and water vapour, or simply by water vapour, or by carbon dioxide, or else by a combustion gas (burner exhaust vapour).

The operating parameters of this reaction are the temperature, or rather the profile of temperatures in the furnace, the dwell time which depends inter alia upon the degree of inclination of the tube and the speed of rotation thereof, the pressure of the water vapour entering the furnace, and rate of entry of granules.

At the outlet of the furnace a device permits separation of the solid obtained, that is to say the carbon black, from the gas.

Each batch of carbon black produced under different operating conditions corresponds to a stationary system and the characteristics of the product can therefore be directly correlated to the operating conditions. On the other hand, the quality of the product is independent of the composition of the initial load. The method according to the invention in this way has the advantage of not depending upon the composition of the initial load.

Each batch is characterised by standardised methods indicated below, in particular specific surface area according to the BET method, iodine adsorption index [French Standard ISO 1304 (g/kg)], dibutyl phthalate adsorption index, and ash and mineral filler content [French Standard ISO 4656-1 ($10^{-5}$ m$^3$/kg)].

A range of temperatures of between approximately 600° and 1,100° C. is used, and the product collected leaves the pyrolysis area at between 150° and 350° C. (particularly between 160° and 300° C.).

The examples hereinafter show some of the results obtained which are felt to be representative of the possibilities offered by this new technology.

$H_2O$ content; expressed in partial pressure in mm Hg, the supporting gas being nitrogen. For water pressure at atmospheric pressure, water has to be injected without introducing in particular inert gas (nitrogen).

The yield of material is the ratio of the output of pyrolysates at the outlet and of the granules at the inlet of the furnace.

These results clearly show that it is possible to obtain from rubber waste, by means of pyrolysis, in an atmosphere charged with water vapour, in a continuously operating sealed rotary furnace or in batches in a sealed rotary furnace, carbon blacks having specifications comparable to commercially available carbon blacks. This applies inter alia to the specific surface area, and the iodine and dibutyl phthalate adsorption indices.

On the other hand, it should be noted, that logically the content of mineral fillers is greater as the mineral products contained in rubber waste are obviously found in the pyrolysate.

These products, comprising classic mineral fillers currently introduced into rubber formulations therefore cannot interfere with the industrial use of these carbon blacks in rubber-based material manufacturing.

Another main characteristic of the invention relates to complementary treatments which can, if necessary, be carried out on the pyrolysates in order to reduce the content of mineral fillers as well as sulphur. One of these treatments is refining of the pyrolysate, particularly by grading.

This consists of subjecting the black resulting from the pyrolysis to treatment with acid under conditions which can be adapted according to the targets required regarding the respective contents in metals, oxides and sulphur.

A certain number of experiments have been carried out for this purpose and some of the results obtained are shown by way of example.

It is clear that it is possible to greatly reduce the mineral residue as well as the sulphur content. The operating conditions can naturally be adapted according to techniques known to the man skilled in the art (conditions of acidity, concentration, time) and allow more exact specifications to be obtained if necessary.

The composition of the gas is fixed at the furnace inlet. The dwell time is between 15 and 200 minutes, preferably between 25 and 75 minutes, so that a constant gas composition can be obtained at the furnace outlet, therefore a dwell time is needed which is long enough for balances to be reached (corresponding to the operating conditions).

The dwell time value applies when the temperature required in the pyrolysis area (furnace) is reached. The temperature increase is counted only from the moment when the minimum temperature range (600° to 1,150° C.) indicated above is reached.

The temperature is an average of the temperatures occurring in the furnace. Dwell time is understood as the time stayed in the central area of the furnace, corresponding to approximately half the length of the furnace where the difference in temperature between the extremities does not exceed 50° C. It is clear that the product is subjected to thermal treatment in the phases of temperature increase from ambient to the point having the value of the controlled variable displayed at the furnace inlet and in the cooling phases due to thermal loss to the exterior. The product leaves the furnace at a temperature which is between 150° and 350° C., according to the value in the central zone (600° to 1,150° C.).

The mass ratio of $H_2O$/granules (indicative of rate) is between 0.1 and 10, preferably between 0.5 and 5 (rate of water vapour generally between 50 and 1,000 liters per 100 grams of rubber waste processed).

The water vapour pressure at the inlet of the pyrolysis area (in the case of pure water in the form of water vapour not water formed in situ) is between 100 mm and 760 mm of mercury (that is 0.1 atmosphere to 1 atmosphere or $1.33 \times 10^4$ to $10^5$ Pascal). The complement to the atmospheric pressure, when the pressure of $H_2O$ does not reach one atmosphere, is obtained by dilution with at least one gas selected from the group constituted by the inert gases (nitrogen, argon, krypton), by carbon dioxide or by any other gas (for example, a combustion gas). If this latter gas contains water vapour, said water vapour is not counted in the content of water vapour described hereinabove.

EXAMPLE 1

In a continuously operating electric rotary pyrolysis furnace it is proposed that 300 grams of rubber waste from which the scrap has been removed, that is to say de-metallised, the granular dimension of which is between 2 and 5 mm, is processed. The average temperature of the furnace is 800° C. and the dwell time is 60 minutes. The dwell time corresponds to the central area of the furnace representing approximately 50% of the total length and corresponding to an area where the difference $\Delta t°$ is less than 30° C.

The furnace is swept by water vapour diluted with an inert gas, which in this case is nitrogen. 300 grams in total of rubber waste is introduced into the furnace.

The initial pressure of the furnace is 570 mm mercury ($5.7 \times 10^4$ Pascal). The flow rate of water vapour is 75 l per hour (that is 56 g per hour of water vapour), and the ratio of water vapour to waste flow rate is 0.19 (mass). In these conditions, the yield by weight of carbon black is 34% (inlet/outlet) and the characteristics of the product obtained are:

BET: 270 $m^2/g$

Iodine index: 233 (in mg of iodine per gram of carbon black)

DBP (dibutyl phthalate adsorption index): 224 milliliters per 100 grams of carbon black.

EXAMPLE 2

In a continuously operating electric rotary pyrolysis furnace it is proposed that 300 grams of rubber waste from which the scrap has been removed, that is to say de-metallised, the granular dimension of which is between 2 and 5 mm, is processed. The average temperature of the furnace is 700° C. and the dwell time is 60 minutes. The dwell time corresponds to the central area of the furnace representing approximately 50% of the total length and corresponding to an area where the difference $\Delta t$ is less than 30° C.

The furnace is swept by water vapour diluted with an inert gas, which in this case is nitrogen. 300 grams in total of rubber waste is introduced into the furnace.

The initial pressure of the furnace is 560 mm mercury ($5.6 \times 10^4$ Pascal). The flow rate of water vapour is 75 l per hour (that is 56 g per hour of water vapour), and the ratio of water vapour to waste flow rate is 0.19 (mass). In these conditions, the yield by weight of carbon black is 38% (inlet/outlet) and the characteristics of the product obtained are:

BET: 91 $m^2/g$

Iodine index: 114 (in mg of iodine per gram of carbon black)

DBP (dibutyl phthalate adsorption index): 110 milliliters per 100 grams of carbon black.

EXAMPLE 3

In a continuously operating electric rotary pyrolysis furnace it is proposed that 300 grams of rubber waste from which the scrap has been removed, that is to say de-metallised, the granular dimension of which is between 2 and 5 mm, is processed. The average temperature of the furnace is 950° C. and the dwell time is 60 minutes. The dwell time corresponds to the central area of the furnace representing approximately 50% of the total length and corresponding to an area where the difference $\Delta t°$ is less than 30° C.

The furnace is swept by water vapour. 300 grams in total of rubber waste is introduced into the furnace.

The initial pressure of the furnace is 760 mm mercury ($7.6 \times 10^4$ Pascal). The flow rate of water vapour is 394 l per hour (that is 300 grams per hour of water vapour), and the ratio of water vapour to waste flow rate is 1 (mass). In these conditions, the yield by weight of carbon black is 21% (inlet/outlet) and the characteristics of the product obtained are:

BET: 720 m(2) per gram

Iodine index: 664 (in mg of iodine per gram of carbon black)

DBP (dibutyl phthalate adsorption index): 222 milliliters per 100 grams of carbon black.

For information, the good values obtained for the iodine and DBP indices can be compared with the values observed for a commercial virgin carbon black of the ISAF (intermediate super abrasion) type: 121 (iodine index), 114 (DPB).

We claim:

1. A method of manufacturing carbon black by pyrolysis of ground, scrap-depleted rubber waste comprising conducting the pyrolysis in the presence of carbon dioxide, in a rotary kiln indirectly heated by combustion of gases generated during said pyrolysis, said kiln having an inlet and an outlet in which the pyrolysis area is operated at between approximately 600° and 1,100°C., the product being collected at a temperature of between approximately 150° and 350° C.

2. A method according to claim 1 in which the ground rubber waste has a particle size between approximately 2 and 5 mm.

3. Method according to claim 1 in which the dwell time is between 25 seconds and 75 minutes.

4. A method according to claim 1, further comprising treating the carbon black produced with acid, whereby mineral fillers are removed.

* * * * *